US008713332B2

(12) United States Patent
Lecourtier

(10) Patent No.: US 8,713,332 B2
(45) Date of Patent: Apr. 29, 2014

(54) SYSTEM AND METHOD OF SUPPLYING AN ELECTRICAL SYSTEM WITH DIRECT CURRENT

(75) Inventor: Georges Lecourtier, Versailles (FR)

(73) Assignee: Bull SAS, Les Clayes-sous-Bois (FR)

( * ) Notice: Subject to any disclaimer, the term of this patent is extended or adjusted under 35 U.S.C. 154(b) by 281 days.

(21) Appl. No.: 13/038,404

(22) Filed: Mar. 2, 2011

(65) Prior Publication Data

US 2011/0213999 A1 Sep. 1, 2011

(30) Foreign Application Priority Data

Mar. 2, 2010 (FR) ...................................... 10 51511

(51) Int. Cl.
| | | |
|---|---|---|
| G06F 1/00 | (2006.01) | |
| G06F 1/26 | (2006.01) | |
| H02J 9/00 | (2006.01) | |
| H02J 1/00 | (2006.01) | |
| H02H 7/00 | (2006.01) | |
| H02H 3/00 | (2006.01) | |
| H02M 1/00 | (2007.01) | |
| H02M 7/00 | (2006.01) | |
| G06F 11/00 | (2006.01) | |

(52) U.S. Cl.
USPC .............. 713/300; 713/320; 307/64; 307/80; 307/85; 320/167; 361/18; 361/83; 361/89; 361/94; 363/49; 363/101; 714/22

(58) Field of Classification Search
USPC ......... 713/300, 320; 307/64, 80, 85; 320/167; 361/18, 83, 89, 94; 363/49, 101; 714/22
See application file for complete search history.

(56) References Cited

U.S. PATENT DOCUMENTS

| 4,673,826 A | 6/1987 | Masson |
| 5,612,580 A | 3/1997 | Janonis et al. |
| 5,894,413 A * | 4/1999 | Ferguson ........................ 363/65 |
| 5,939,799 A * | 8/1999 | Weinstein ....................... 307/64 |
| 7,060,379 B2 * | 6/2006 | Speranza et al. ................. 429/9 |

(Continued)

FOREIGN PATENT DOCUMENTS

| DE | 37 04 426 A1 | 11/1987 |
| DE | 102 44 608 A1 | 4/2004 |
| EP | 0 402 833 A2 | 12/1990 |

OTHER PUBLICATIONS

Vogman, Viktor and Watts, Andrew; "Cold Redundancy—A New Power Supply Technology for Reducing System Energy Usage," IDF 2009 Intel Developer Forum, published Jul. 27, 2009.

*Primary Examiner* — Stefan Stoynov
(74) *Attorney, Agent, or Firm* — Miles & Stockbridge P.C.

(57) ABSTRACT

A system for supplying an electrical system with direct current, the system including at least two direct current power supply devices each having means of electrical connection to an alternating current power supply source and an AC/DC converter of alternating current into direct current, a module for managing the power supply of the electrical system which, after reception of an information of failure of a first active power supply device, transmits a command to start up a second inactive power supply device and a back up electrical energy storage device electrically by-pass connected between the power supply devices and the electrical system. The management module also receives the information of failure from the back up device and/or from the electrical system and transmits the command to start up the second power supply device during a discharge phase of the back up device.

11 Claims, 2 Drawing Sheets

(56) References Cited

U.S. PATENT DOCUMENTS

| | | |
|---|---|---|
| 2001/0022472 A1 | 9/2001 | Codina et al. |
| 2005/0029984 A1 | 2/2005 | Cheng et al. |
| 2005/0036253 A1 | 2/2005 | Tian et al. |
| 2007/0152506 A1 | 7/2007 | Meyers et al. |
| 2007/0200432 A1 | 8/2007 | Yano et al. |

* cited by examiner

SYSTEM AND METHOD OF SUPPLYING AN ELECTRICAL SYSTEM WITH DIRECT CURRENT

The present invention relates to a system for supplying an electrical system with direct current. It also relates to a method implemented by said system.

More precisely, the invention relates to a power supply system comprising at least two direct current power supply devices each comprising means of electrical connection to an alternating current supply source and an AC/DC converter of alternating current into direct current.

For example, it applies to an information processing system comprising at least one computer that has to be supplied with extra-low voltage. The direct current power supply of such an information processing system is generally intended to be connected to at least one alternating current power supply network through such a supply system, the supply devices of which deliver a current at extra-low voltage.

BACKGROUND OF THE INVENTION

By "extra-low voltage" is understood a voltage generally considered as "safety voltage", which enables an operator to handle without danger any electrical component at said voltage. Such a voltage is moreover generally adapted to the electrical components of an information processing system. Several domains are legally defined in France and in Europe (ELV, SELV, PELV, FELV) but all place extra-low voltages below the threshold of 120 V with direct current and below the threshold of 50 V with alternating current.

The voltage of an alternating current distributed by an electricity distribution network is in general of the order of 220/230 V, which thus represents a priori danger for an operator. On the other hand, it is generally considered that a voltage of 50 V or less does not represent danger in handling. Thus, in telecommunications applications, the transmission data processing systems are generally subjected to a voltage of around 48 V. In aviation, the on-board components are generally subjected to a direct voltage of around 28 V. Finally, a computer type information processing system is generally subjected to a direct voltage of around 12 V.

An information processing system is for example a series of computer servers interconnected in a local network, thus forming a HPC (High Performance Computing) computer. In this case, as in other sensitive applications (computer server, desktop or laptop micro-computer, telecommunications radiofrequency station, etc.), it is important that the operation of the electrical system is not disturbed by failures in the current power supply, whether it is micro-power cuts of the alternating current power supply network or failures in the direct current power supply devices themselves. Indeed, such failures, even when they only last several hundreds of milliseconds, can bring about computing errors, losses of data or very penalizing malfunctions of the HPC computer.

By way of example, micro-power cuts are quite frequent, since the administrator of the alternating current power supply network may, as the need arises, have to black out parts of the network. These have in general a duration equivalent to several periods of the alternating current: for alternating current of 50 Hertz, a micro-power cut of ten to twelve periods thus lasts between 200 and 250 milliseconds. Moreover, the restart up of a direct current power supply device following a micro-power cut can itself also take 100 to 200 milliseconds, which gives a micro-power cut, seen from the electrical system, which can last up to 450 milliseconds.

When an electrical system, particularly of HPC computer type, is supplied by several direct current power supply devices, it is well known to choose each of these devices so that it is capable of supplying alone the whole of the current consumed by the electrical system while providing an analogical assembly for balancing the supplies, which ensures at each instant that the supply devices all supply current in substantially equal quantity as long as they are all operating. An additional precautionary measure consists in providing a different alternating current power supply source for each power supply device.

Thus, in the event of failure of one of the direct current power supply devices, either due to a failure of its alternating current power supply source or due to its own failure, the other device(s) can take over without risking reaching their power supply saturation. However, this solution is not optimal in terms of ecological consumption of electrical resources since, in normal operation of the supply devices, each of them then operates at less than 50% of its maximum capacity and far from its optimal efficiency. However, the standards that are being developed today are more and more demanding in ecological consumption of resources and require that the power effectively developed by direct current power supply devices is best adjusted to the electrical systems that they supply to improve efficiencies.

A solution, known as "Cold Redundancy Technology", was recently introduced within the framework of the IDF2009 (Intel Developer Forum 2009), which was held from the 22 to the 24 Sep. 2009 in San Francisco (USA). This solution consists for example, when the direct current power supply comprises two supply devices, in only soliciting one at an optimal efficiency level and only starting the other when the electrical system to be supplied passes to a higher consumption level at a predetermined threshold or when a failure occurs in the active power supply device. But it is not indicated how the transition is managed in the event of failure. Indeed, each direct current power supply device comprises a capacitor or series of capacitors, known as "hold up" capacitor bank, capable a priori of resisting a mains power cut of several tens of milliseconds, for example around 20 ms. But failures (particularly mains power cuts) of a power supply device often reach several hundreds of milliseconds as does a transition of one device to another. The "hold up" capacitor bank thus does not make it possible to ensure a transition without risk of damaging the electrical system supplied.

Moreover, this solution is like twin supply systems with transfer of supply by automatic commutation, by means of a commutation management module, such as may be proposed by firms such as Schneider Electric. But these systems, generally proposed for vital installations such as a stock of medical devices of a hospital, are not adapted for installations more sensitive to power cuts such as servers or computing centers.

There is also known, from patent applications published with numbers EP 0 402 833 and US 2001/0022472, a solution consisting in providing, further to a first main power supply device and a second reserve or replacement power supply device, a supplementary back up electrical energy storage device able to be discharged during the transition phase between the first and second power supply devices in case of failure of the first one.

Finally, patent application published with number US 2007/0152506 discloses a primary direct current power supply source converting the alternating current of a commercial power utility. Furthermore, it is indicated that in case of complete failure of the primary direct current power supply source, a supplementary back up electrical energy storage source based on fuel cells is called into action. Moreover, capacitors are provided at the output of the fuel cells, so as to be continuously charged and for bridging between the primary direct current power supply source and the fuel cells.

But these solutions given by documents EP 0 402 833, US 2001/0022472 and US 2007/0152506 lack of reliability, since the failure information which may involve the transition phase and the possible start up of the back up device comes from the failing power supply itself.

It may thus be desired to provide a direct current power supply system with several supply devices that is both efficient from an ecological point of view, in other words efficient in its electrical energy consumption supplied by the mains, and reliable when a failure occurs.

SUMMARY OF THE INVENTION

An object of the invention is thus a system for supplying an electrical system with direct current, comprising at least two direct current power supply devices, each comprising means of electrical connection to an alternating current power supply source and an AC/DC converter of alternating current into direct current, a management module of the power supply of the electrical system designed, after reception of an information of failure of a first active power supply device, to transmit a command to start up a second inactive power supply device, and a back up electrical energy storage device electrically by-pass connected between the supply devices on the one hand and the electrical system on the other hand, characterized in that the management module is moreover designed to receive the information of failure from the back up device and/or from the electrical system and to transmit the command to start up the second power supply device during a discharge phase of the back up device.

Indeed, the presence of the back up device makes it possible to envisage risk-free transitions from one power supply device to the other when said transition takes place during a discharge phase of said back up device. It thus makes it possible in normal operation to optimize the operation of each active direct current power supply device while maintaining inactive one or more other devices ready to be started up in their turn in the event of failure. Moreover, since the management module is designed to receive the information of failure, not only from the failing power supply itself, but also from the back up device and/or from the electrical system, it makes the power supply system highly reliable.

Furthermore, by being placed in the power supply circuit to charge itself directly by means of the current supplied by the direct current power supply devices and discharge itself directly to the direct current power supply of the electrical system, the proposed back up device has a reduced size through better integration with the electrical system that it is intended to supply temporarily in the event of failure.

In an optional manner, the management module is connected, by means of a numerical data transmission bus, to the supply devices, to the back up device and to the electrical system so as to receive and transmit information and/or command data from and to said supply devices, said back up device and said electrical system.

Also in an optional manner, the electrical system comprises an information processing system with at least one computer supplied with extra-low voltage.

Also in an optional manner, the back up device comprises:
electrical energy storage means,
means for charging the electrical energy storage means from part of the direct current supplied by at least one of the supply devices, and
means for discharging the energy stored in the electrical energy storage means to the power supply of the electrical system, at a substantially constant predetermined voltage.

Also in an optional manner, the electrical energy storage means of the back up device comprise at least one electrochemical double layer supercapacitor.

Also in an optional manner, the electrical energy storage means of the back up device comprise at least one circuit of supercapacitors arranged in series.

Another object of the invention is a method for supplying an electrical system with direct current, by means of at least two direct current power supply devices, each comprising means of electrical connection to an alternating current power supply source and an AC/DC converter of alternating current into direct current, of a module for managing the power supply of the electrical system designed, after reception of an information of failure of a first active power supply device, to transmit a command to start up a second inactive power supply device, and of a back up electrical energy storage device electrically by-pass connected between the supply devices on the one hand and the electrical system on the other hand, characterized in that, the management module being designed to receive the information of failure from the back up device and/or from the electrical system, the command to start up the second power supply device is transmitted by the management module during a discharge phase of said back up device.

In an optional manner, a power supply method according to the invention may comprise the following steps, following the reception by the management module of the failure information of the first active power supply device and the start up of the discharge phase of the back up device:
waiting for a possible end of the failure, for a duration at the most equal to a maximum discharge duration of the back up device making it possible to supply the electrical system at a substantially constant predetermined voltage less a start up duration necessary for the second inactive power supply device,
at the end of this wait, if the failure lasts, sending, by the management module, of a command to start up the second power supply device.

Also in an optional manner, the start up duration necessary for the second inactive power supply device is determined as being the duration between the sending by the management module of a command to start up the second power supply device and an instant at which said second power supply device is actually suited to supplying the electrical system at said substantially constant predetermined voltage.

Also in an optional manner, a supply method according to the invention may comprise the following steps, following the reception by the management module of the failure information of the first active power supply device and the start up of the discharge phase of the back up device, and if the second inactive power supply device is detected by the management module as not being available to replace the first active power supply device:
waiting for a possible end of the failure, for a duration at the most equal to a maximum discharge duration of the back up device making it possible to supply the electrical system at a substantially constant predetermined voltage less a duration necessary for shutting down the electrical system,
at the end of this wait, if the failure lasts, sending, by the management module, of a command to shut down the electrical system.

Also in an optional manner, a supply method according to the invention may further comprise, following the reception by the management module of the failure information of the first active power supply device, a transmission, by the management module to the electrical system, of a command to switch to a reduced consumption mode of computer, notably to a mode of reduction of operating frequency and voltage of computer, when the electrical system comprises an information processing system with at least one computer supplied with extra-low voltage.

BRIEF DESCRIPTION OF THE DRAWINGS

The invention will be better understood on reading the description that follows, given uniquely by way of example and by referring to the appended drawings, in which.

DETAILED DESCRIPTION

Figure 1:
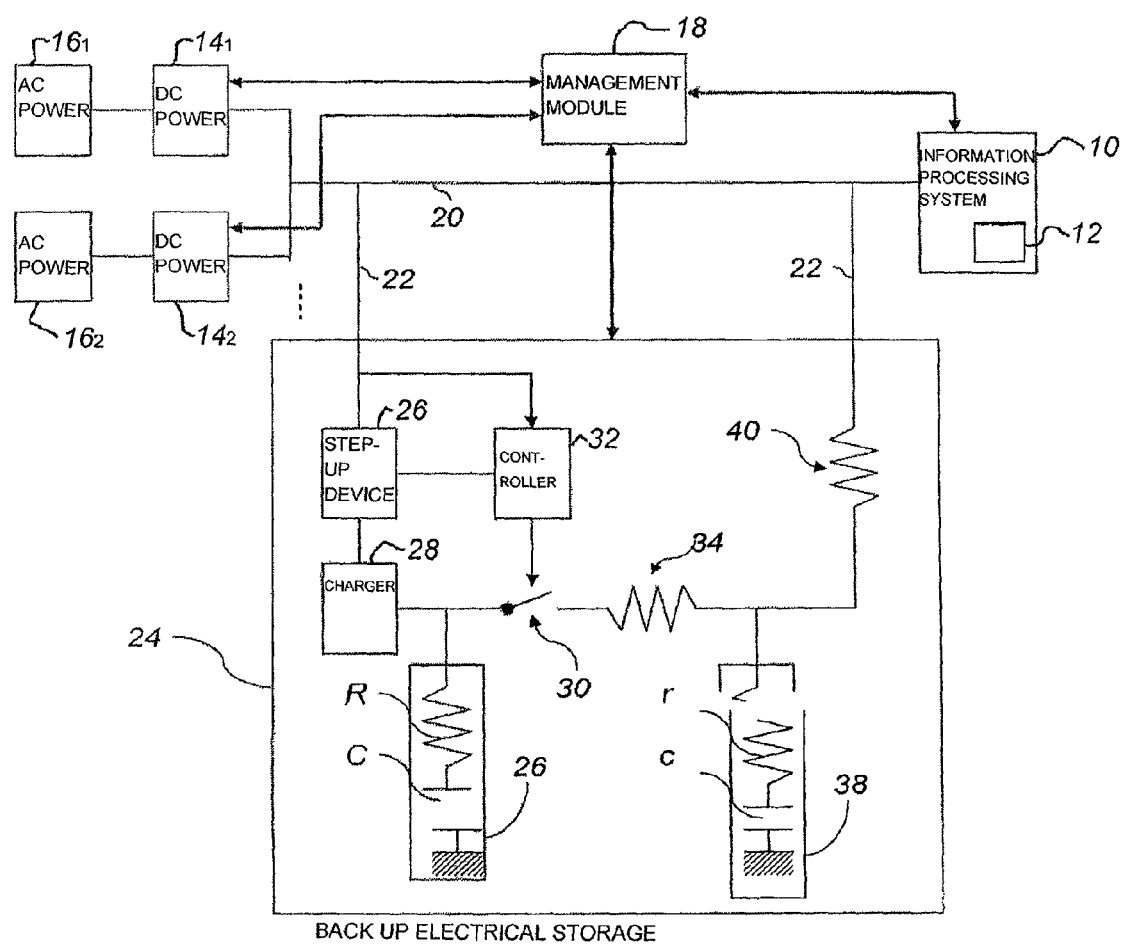
FIG. 1 schematically represents the general structure of a system for supplying an electrical system with direct current, according to an embodiment of the invention.

The installation represented in FIG. 1 comprises an electrical system 10, for example an information processing system with at least one computer 12. This information processing system 10 is intended to be supplied with direct current, at an intensity that it imposes as a function of its consumption at each instant and at a substantially constant predetermined voltage. Purely by way of illustration, the information processing system 10 is a series of computer servers forming an HPC computer. It is for example designed to be supplied with maximum direct current of 700 A at a substantially constant voltage of 12 V.

By "substantially constant" is understood a direct voltage, the variations of which are sufficiently low around its reference value (as it happens 12 V in the application considered) so that the information processing system 10 can withstand them without damaging its information processing components. Given that information processing systems, for example of computer type, are provided with an internal conversion stage that regulates the current that they consume as a function of the voltage that they use to supply a very regular voltage that can go down to less than 1 V, variations of 10 to 15% around the reference value of the direct voltage known as substantially constant supplied at the input of these systems are acceptable. Thus, for example, it is acceptable to consider that a substantially constant direct voltage of 12 V can vary between 11 and 13 V. Such a substantially constant voltage is for example obtained by a regulation of the direct voltage supplied to the information processing system 10 by means of a reference maximum voltage threshold and minimum voltage threshold.

The information processing system 10 is more precisely supplied with current by a direct current power supply system comprising at least two direct current power supply devices $14_1$ and $14_2$, each comprising means of electrical connection to an alternating current power supply source $16_1$ or $16_2$ and an AC/DC converter of alternating current into direct current (not represented). More precisely, in the example of FIG. 1, given purely by way of illustration and non limiting, the direct current power supply system comprises a first direct current power supply device $14_1$ connected to a first alternating current power supply source $16_1$ and a second direct current power supply device $14_2$ connected to a second alternating current power supply source $16_2$. As indicated previously, an optional but advantageous precautionary measure consists in providing that the alternating current power supply sources $16_1$ and $16_2$ are different. Moreover, more than two power supply devices such as those described above could be provided. It will be noted that the alternating current power supply sources $16_1$ and $16_2$ deliver in a conventional manner a current at 50 Hz at a voltage of 230 V. It will also be noted that, in a conventional manner, the AC/DC converter of each direct current power supply device transforms the alternating current at 50 Hz at a voltage of 230 V into a direct current delivered at a voltage of 12 V.

Each of the two direct current power supply devices $14_1$ and $14_2$ is chosen to have a maximum efficiency (in general 92 to 94%) when it supplies 700 A at a substantially constant voltage of 12 V, in other words when it supplies what is consumed at the maximum by the information processing system 10. Each direct current power supply device is thus optimized for the expected consumption of the information processing system 10 when operating at full capacity.

The direct current power supply system moreover comprises a module 18 for managing the power supply of the information processing system 10. Such a management module 18 is connected, for example by means of a numerical data transmission bus, to the supply devices $14_1$ and $14_2$ and to the information processing system 10 so as to receive and transmit information and/or command data from and to said supply devices $14_1$ and $14_2$ and said information processing system 10. The data transmission bus is not directly illustrated in FIG. 1 but is functionally represented by the double arrows in bold characters symbolizing the exchanges of data from and to the management module 18. It may be any data transmission bus adapted in the context of the illustrated application: for example an I²C (developed by Philips), SPI (developed by Motorola), JTag (normalized by IEEE) bus or other.

In practice, the management module 18 may be of software or hardware type and, if it is of hardware type, may comprise a dedicated "hardware" type equipment or programmed chip. It may be integrated into the information processing system 10, particularly integrated into an HPC control server when the system 10 is a HPC computer.

The information processing system 10, more particularly its direct current power supply, is connected to the supply devices $14_1$ and $14_2$ by means of a first power supply circuit 20.

A second circuit 22 for by-passing part of the direct current supplied by either of the supply devices $14_1$ and $14_2$ is arranged in the power supply system parallel to the first circuit 20 between the supply devices $14_1$ and $14_2$ and the information processing system 10. This second circuit 22 comprises a back up electrical energy storage device 24 suited to supplying the information processing system 10 in the event of failure in the circuit 20.

It thus enables the back up device 24 to draw part of the direct current delivered for the information processing system 10 by either of the supply devices $14_1$ and $14_2$ in order to store electrical energy, and supply, in the event of failure of an active power supply device or the alternating current power supply network (micro-power cut), direct current, drawn from the stored electrical energy, to the information processing system 10. In other words, the back up device 24 is designed to take over from the active power supply device in the event of failure.

The back up device 24 comprises electrical energy storage means 26. These storage means 26 may comprise one or more conventional batteries. Batteries of accumulators generally have a good stored energy per unit of volume ratio. On the other hand, they have a poor emitted peak power per unit of volume ratio, which makes them not very advantageous for applications where the information processing system 10 consumes a direct current of high intensity. This is the case in particular when the information processing system 10 is a HPC computer since a direct current of 700 A may be necessary. In this case, the electrical energy storage means 26 comprise advantageously at least one supercapacitor, preferably at least one circuit of supercapacitors arranged in series, the emitted peak power per unit of volume ratio of which is considerably higher. This peak power cannot however be emitted for too long a duration, but is easily sufficient to make up for the micro-power cuts of an alternating current power supply network of good quality or the transitions between two direct current power supply devices, since these generally do not exceed several hundreds of milliseconds.

Supercapacitors are generally of EDLC (Electrochemical Double Layer Capacitor) type, in other words designed according to the electrochemical double layer method. They have an internal resistance considerably lower than that of batteries. The means 26 for storing electrical energy with supercapacitors may be modeled by an RC series type circuit (i.e. circuit comprising a resistor and a capacitor in series), connected on the one hand to earth and on the other hand to the second circuit 22, of resistance R and of capacitance C.

The back up device 24 moreover comprises means 28 for charging the electrical energy storage means 26 from part of the direct current supplied by at least one of the direct current power supply devices $14_1$ or $14_2$. Said charging means 28 are constituted of a conventional supercapacitors charger and will thus not be detailed. They make it possible to charge the electrical energy storage means 26 in several minutes, in general not more than three minutes, thus only slightly disturbing the operation of the information processing system 10.

The back up device 24 also comprises means 30, 32 for discharging the energy stored in the electrical energy storage means 26 to the power supply of the information processing system 10, at a given intensity (imposed by the information processing system 10) and a substantially constant predetermined voltage, following the detection of a failure (voltage drop below an acceptable threshold) in the power supply circuit 20.

These discharge means comprise a switch 30 controlled by a controller 32. The switch 30 comprises for example at least one pair of field effect N-MOS transistors arranged head to tail in series. This arrangement by pair makes it possible to isolate the supercapacitors of the electrical energy storage means 26 from the information processing system 10, whatever the voltage at the terminals of the supercapacitors and the information processing system 10. Moreover, if at the moment of discharge the current intended to flow through the switch 30 is greater than that which such a pair of transistors can withstand, several pairs of transistors arranged in parallel, commanded by the same controller 32, may be provided to form the switch 30.

The switch 30 is illustrated in FIG. 1 by an ideal on off switch with which is associated an internal resistance 34. The controller 32 is, for its part, designed to be able to detect a failure as soon as the value of the voltage supplied to the information processing system 10 drops below a predetermined threshold voltage.

As indicated previously, the direct current of 700 A supplied by any of the direct current power supply devices $14_1$ or $14_2$ to the power supply of the information processing system 10 has for example a voltage of 12 V in the first power supply circuit 20. The current withdrawn by the second by-pass circuit 22 thus has a priori this same voltage of 12 V. However, in order that in the event of failure the electrical energy storage means 26 can supply a direct current to the information processing system 10 at this same voltage of 12 Volts, it is necessary that they are charged at a higher voltage, particularly on account of the internal resistance of the electrical energy storage means 26 and that of the switch 30. For example, this higher necessary voltage may be close to 15 Volts. Moreover, due to the fact that the switch 30 is composed of field effect MOS transistors, the gate of which has to be supplied, the controller 32 needs to supply in general a voltage greater than 20 Volts.

For these reasons, a voltage step up device 36 of conventional type is provided upstream of the charger 28 and the controller 32 in the second circuit 22, to step up the voltage from 12 V to 21 V for example. According to another variant, two different voltage step up devices could be envisaged, one for the charger 28, the other for the controller 32, since the voltages that they require are not the same.

The back up device 26 operates in the following manner:
when the information processing system 10 is supplied with direct current by any of the direct current power supply devices $14_1$ or $14_2$, part of this current is diverted by the second circuit 22 for charging the electrical energy storage means 26, as long as they are not yet completely charged,
when a failure is detected by the controller 32, the latter controls the closing of the switch 30 so that the electrical energy storage means 26 take over from the first malfunctioning power supply circuit 20.

The time taken by the switch 30 to close and to allow the current to flow from the electrical energy storage means 26 may however be sufficient to disturb the operation of the information processing system 10. The back up device 24 thus comprises advantageously additional electrical energy storage means 38, for example constituted of simple capacitors, known as smoothing capacitors, arranged in parallel at the output of the switch 30. The additional electrical energy storage means 38 may, like the storage means 26 with supercapacitors, be modeled by a RC series type circuit, connected on the one hand to earth and on the other hand to the second circuit 22 at the output of the switch 30, of resistance r and of capacitance c. By way of non limiting example, twenty or so smoothing capacitors may be arranged at the output of the switch 30, for a resistance r of 0.5 mΩ and a capacitance c of 0.01 F.

Thanks to these additional electrical energy storage means 38, the back up device 24 operates more precisely in the following manner:
when the information processing system 10 is supplied with direct current by any of the direct current power supply devices $14_1$ or $14_2$, part of this current is diverted for a limited time by the second circuit 22 for charging the electrical energy storage means 26, as long as they are not yet completely charged,
a small part of this current is also diverted for a limited time for charging the additional electrical energy storage means 38 as long as they are not yet completely charged,
when a failure is detected by the controller 32, this controls the closing of the switch 30,
between the start of the failure and the actual closing of the switch 30, part of the electrical energy accumulated in the additional energy storage means 38 is transmitted to the information processing system 10, and
when the switch 30 is actually closed, the electrical energy storage means 26 take over from the first malfunctioning power supply circuit 20.

It will be understood that it is not useful to provide supercapacitors in the additional electrical energy storage means 38 since they are only intended to supply their stored energy for a very short transition time of the order of several microseconds, considerably shorter than the duration of the failure.

In concrete terms, the back up device 24, with its charger 28, its controller 32, its voltage step up device 36, its switch 30, and its storage means 26 and 38, is fitted on a card forming support and having an internal resistance 40 equal for example to 0.1 mΩ.

Whereas the information processing system 10 is supplied by any of the direct current power supply devices $14_1$ or $14_2$ with direct current of 12 V from an alternating current at 230 V via the first circuit 20, the second circuit 22 is itself also connected to the first circuit 20 so that it enables a charging of the back up device 24 by means of this direct current of 12 V. This charging takes place by a consumption of direct current generally between 0.5 and 18 A. The second circuit 22 also enables the controller 32 to withdraw the value of the voltage of the direct current supplied by the first circuit 20 so as to be able to detect any failure, by the appearance of a voltage drop.

The voltage step up device 36, for example a DC/DC chopping converter, steps up the voltage of the direct current supplied by the second circuit 22 into a direct current at 21 V of intensity between 0 and 9 A depending on whether the back up device 24 is in a situation of charge or not. This current supplies the controller 32 and the charger 28.

The charger 28 supplies in its turn to the electrical energy storage means 26 a direct current, the intensity of which varies between 0 and 12 A depending on whether the back up device 24 is in a situation of charge or not.

It is advisable to dimension the electrical energy storage means 26 so that in a situation of discharge, they can supply a current of 700 A for, for example, at the most 480 ms under a voltage of around 12 V always at least greater than a predetermined limit, set for example at 11 V.

In a concrete manner, the electrical energy storage means 26 comprise at least one circuit of six supercapacitors arranged in series. For acceptable dimensions, it is possible to find supercapacitors, the characteristics of which are as follows: a capacitance equal to 600 F, an internal resistance equal to 0.83 mΩ and a maximum potential difference withstood at the terminals of the supercapacitor of 2.7 V. Thus, a circuit of six supercapacitors arranged in series has an equivalent capacitance C=100 F and an equivalent internal resistance R=4.98 mΩ. It may be shown that the evolution after a time T of the voltage delivered by such a circuit during the discharge of its supercapacitors bears out the following equation:

$$V=(V_0-IT/C)-RI, \quad (1)$$

where $V_0$ is the charge voltage that the charger 28 has to deliver, I=700 A the current delivered by the circuit, T=480 ms the maximum discharge time.

It may be seen that, under these conditions, in order that the voltage V delivered by the circuit is always greater than 11 V, it is necessary that the charge voltage $V_0$ is at least 17.85 V. However, the maximum potential difference withstood at the terminals of the aforementioned six capacitors is 6×2.7 V=16.2 V. It is thus apparent that a single circuit of six capacitors is not sufficient.

By providing two circuits of six capacitors such as those cited before, arranged in parallel, electrical energy storage means 26 are conceived, the equivalent capacitance C of which is equal to 200 F and the equivalent internal resistance R is equal to 2.49 mΩ. Under these new conditions, in order that the voltage V of the current delivered by the electrical energy storage means 26 is always greater than 11 V, it is necessary that the charge voltage $V_0$ is at least 14.42 V. In practice, the voltage drop at the terminals of the switch 30 imposes a slightly higher charge voltage, for example equal to $V_0$=14.8 V. Taking into account moreover the internal resistance of the electrical energy storage means 26, it is thus possible for the second circuit 22 to deliver a current of 700 A at a substantially constant voltage, in other words always between 11 and 13 V, in a situation of discharge of the back up device 24, for a maximum duration of 480 ms. It will also be noted that electrical energy storage means 26 having these parameters of equivalent resistance and capacitance by means of supercapacitors may be charged in less than three minutes by the charger 28.

The possible or even desirable duplication of the circuit of six supercapacitors in the electrical energy storage means 26 has just been detailed. It is also possible, for practical reasons, to duplicate the voltage step up device 36, the charger 28, the controller 32 and the switch 30.

The back up device 24 described above is itself also connected to the management module 18 by means of the numerical data transmission bus that connects the management module 18 to the other components of the installation.

The management module 18 is thus suited to receiving and emitting information and/or command data from and to supply devices $14_1$ and $14_2$, the back up device 24 and the information processing system 10.

It is more precisely suited to receiving failure warnings from an active power supply device $14_1$ or $14_2$, from the back up device 24 when it has itself automatically detected said failure, or as a last resort from the information processing system 10. It is also suited to receiving a start up information of the discharge of the back up device 24 if said device is suited to discharging itself automatically when a failure occurs.

Moreover, it is in a general manner programmed to:
transmit start up commands of inactive supply devices,
transmit shut down commands of active supply devices,
transmit a command to start up the back up device 24 if said device is not suited to discharging itself automatically when a failure occurs, and
transmit a clean shut down command of the information processing system 10.

Thus, according to the invention, the management module 18 is programmed, after reception of an information of failure of an active power supply device $14_1$ or $14_2$, to transmit a command to start up another inactive power supply device ($14_2$ or $14_1$) so as to activate the start up of the inactive power supply device during a discharge phase of the back up device 24.

Figure 2:
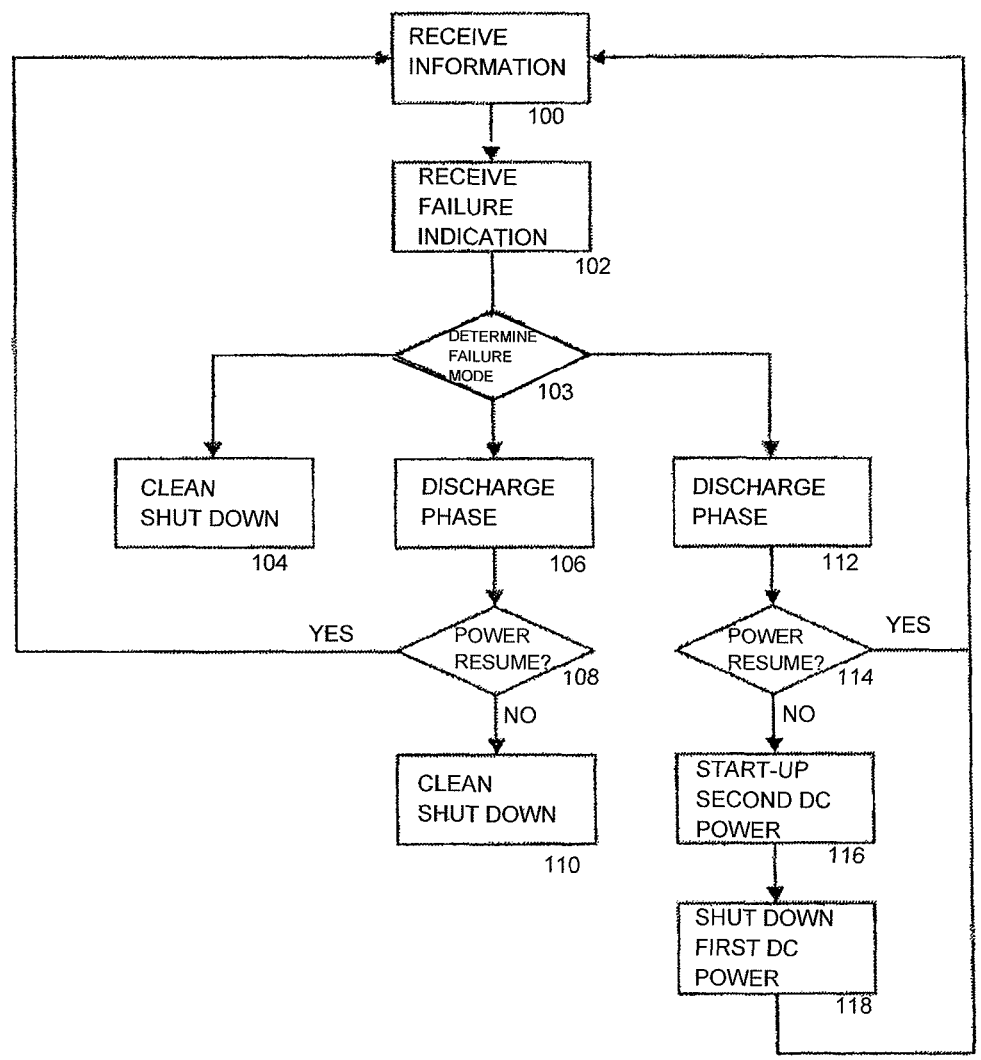
FIG. 2 illustrates the successive steps of a method implemented by a management module of the system of FIG. 1.

A possible operation of the management module 18 will now be detailed with reference to FIG. 2.

During a first step 100 of operation without particular event, the management module 18 receives if appropriate information messages from the active components of the installation, for example from the information processing system 10 and the first direct current power supply device $14_1$. It moreover receives status information on the other components, such as the second inactive direct current power supply device $14_2$ and the back up device 24. This status information informs for example the management module 18 of the availability (i.e. operational character) of these other components if required.

During a step 102, a failure occurs in the power supply of the information processing system 10 and at least one warning is transmitted to the management module 18 from the active power supply device $14_1$, from the back up device 24 when it has itself automatically detected said failure, or as a last resort from the information processing system 10. This failure may be due to a more or less long cut of the alternating current power supply source $16_1$ or to a failure of the active power supply device $14_1$ itself.

During the step 103, in an optional manner and following the reception of the warning (i.e. the failure information of the first active power supply device $14_1$) by the management module 18, a command to switch to a reduced consumption mode can be transmitted by the latter to the information processing system 10. This reduced consumption mode for instance consists in reducing the operating frequency and voltage of the computer 12, when the system 10 includes at least one such computer. In particular, if the computer 12 is designed to operate at a 3 GHz frequency with a processor core submitted to a 1.2 V voltage, the reduced consumption mode can consist in operating at a 800 MHz or less frequency with a processor core submitted to a 0.8 V or less voltage. In such a way, it is possible to immediately reduce the power consumption of the information processing system 10 with a factor 3 or 4.

Then, according to the statuses of the second inactive direct current power supply device $14_2$ and the back up device 24, the operation of the management module 18 differs. Instead, it involves:
the execution of a step 104 if the second direct current power supply device $14_2$ and the back up device 24 are unavailable,
the execution of a succession of steps 106, 108 and 110 if the back up device 24 is available but not the second direct current power supply device $14_2$, or
the execution of a succession of steps 112, 114, 116 and 118 if the second direct current power supply device $14_2$ and the back up device 24 are available.

If the second direct current power supply device $14_2$ and the back up device 24 are not available, the least failure, even of short duration such as a micro-power cut of the supply source $16_1$, may have serious consequences on the operation of the information processing system 10. So, in the event of failure detected at step 102, one passes in this situation to step 104 during which the management module 18 sends a clean shut down command of the information processing system 10 during the automatic discharge phase of the "hold up" capacitor bank of the first direct current power supply device $14_1$. By "clean shut down" is understood a shut down according to a rigorous predetermined sequence of steps ensuring the shut down of all of the processes of the information processing system 10 without risk of damaging it. It is assumed that this clean shut down is of duration T1 less than or equal to the duration T2 of the automatic discharge of the "holdup" capacitor bank.

If the back up device 24 is available but not the second direct current power supply device $14_2$, in the event of failure detected at step 102, one passes in this situation to step 106 during which the back up device 24 automatically enters into discharge phase and if appropriate informs the management module 18 thereof. In a variant, if the back up device 24 does not automatically enter the discharge phase, this may be brought about by the management module 18 by emission of a specific command.

The following step 108 is a step of waiting, by the management module 18, for the power supply to start again, in other words an end of the failure. If the maximum discharge duration of the back up device is noted T3, in other words the duration beyond which it is no longer suited to supplying a direct current at the desired voltage to the information processing system 10, then the step 108 last at the most T3−T1.

If the power supply restarts during this step, one passes to step 100 (while passing again possibly to normal consumption mode of the information processing system 10 if the reduced consumption mode was activated at step 102). If not, one passes to step 110 during which the management module 18 sends a clean shut down command of the information processing system 10.

If the second direct current power supply device $14_2$ and the back up device 24 are available, in the event of failure detected at step 102, one passes in this situation to step 112 during which the back up device 24 automatically enters into discharge phase and if appropriate informs the management module 18 thereof. In a variant, if the back up device 24 does not automatically enter into discharge phase, it may be brought about by the management module 18 by emission of a specific command.

The following step 114 is a step of waiting, by the management module 18, for a restart of the power supply, in other words an end of the failure. If the start up duration of the second direct current power supply device $14_2$ is noted T4, in other words the time necessary so that the latter is suited to providing a direct current at the desired voltage to the information processing system 10 after transmission by the management module 18 of a start up command, then step 114 lasts at the most T3−T4.

If the power supply restarts during this step, one passes to step 100 (while passing again possibly to normal consumption mode of the information processing system 10 if the reduced consumption mode was activated at step 102). If not, one passes to step 116 during which the management module 18 sends a command to start up the second direct current power supply device $14_2$.

In a practical manner and by way of purely illustrative example, it is possible to have the following values for T1, T2, T3 and T4:
T1=T2=20 ms,
T3=480 ms,
T4=100 ms.

In an optional manner, if the first direct current power supply device $14_1$ has not shut down by itself, due to failure for example, one passes to a step 118 during which the management module 18 sends a command to shut down the first direct current power supply device $14_1$. The cause of the failure may then be dealt with by an operator.

Finally, step 118 is followed by a return to step 100 (while passing again possibly to normal consumption mode of the information processing system 10 if the reduced consumption mode was activated at step 102), except for the difference that it is now the second direct current power supply device $14_2$ that is active and the first direct current power supply device $14_1$ that is inactive. At the start of this step 100 also, the back up device 24 recharges itself to be once again available in the event of future failure.

It is clearly apparent that a direct current power supply system such as that described previously makes it possible to improve the efficiency of direct current power supply devices by enabling them to operate to the best of their efficiency without however taking any risk in the event of occurrence of a failure. This power supply system is thus easily rendered compliant with the environmental requirements of new and future standards that are necessary.

It will be noted moreover that the invention is not limited to the previously described embodiment. It will indeed be clear to those skilled in the art that various modifications may be made to the embodiment described above, in light of the teaching that has been disclosed to them. In the claims that follow, the terms used must not be interpreted as limiting the claims to the embodiment described in the present description, but should be interpreted as including therein all the equivalents that the claims aim to cover on account of their formulation and the provision of which is within the reach of those skilled in the art by applying their general knowledge to the implementation of the teaching that has been disclosed to them.

The invention claimed is:

1. A system for supplying an electrical system with direct current, comprising:
   at least two direct current power supply devices each comprising means of electrical connection to an alternating current source and an AC/DC converter of alternating current into direct current;
   a module for managing the power supply of the electrical system and configured, after reception of an information of failure of a first active power supply device among said at least two direct current power supply devices, to transmit a command to start up a second inactive power supply device of said at least two direct current power supply devices; and
   a back up electrical energy storage device electrically by-pass connected between the at least two direct current power supply devices and the electrical system,
   wherein the management module is configured to receive the information of failure from the back up device or from the electrical system, or both, and to transmit the command to start up the second power supply device during a discharge phase of the back up device.

2. The power supply system according to claim 1, wherein the management module is connected, by means of a numerical data transmission bus, to the at least two direct current power supply devices, to the back up device, and to the electrical system so as to receive and transmit information or command data, or both, from and to said at least two direct current power supply devices, said back up device, and said electrical system.

3. The power supply system according to claim 1, wherein the electrical system comprises an information processing system with at least one computer supplied with extra-low voltage.

4. The power supply system according to claim 1, wherein the back up device comprises:
   electrical energy storage means;
   means for charging electrical energy storage means from part of the direct current supplied by at least one of the at least two direct current power supply devices, and
   means for discharging the energy stored in the electrical energy storage means to the power supply of the electrical system at a substantially constant predetermined voltage.

5. The power supply system according to claim 4, wherein the electrical energy storage means of the back up device comprises at least one electrochemical double layer supercapacitor.

6. The power supply system according to claim 5, wherein the electrical energy storage means of the back up device comprises at least one circuit of supercapacitors arranged in series.

7. A method for supplying an electrical system with direct current, comprising:
   providing at least two direct current power supply devices each comprising means of electrical connection to an alternating current source and an AC/DC converter of alternating current into direct current;
   receiving, by a module for managing the power supply of the electrical system, information of failure of a first active power supply device among said at least two direct current power supply devices;
   transmitting, after aid receiving of information of failure, by said management module, a command to start up a second inactive power supply device of said at least two direct current power supply devices;
   providing a back up electrical energy storage device—electrically by-pass connected between the at least two direct current power supply devices and the electrical system;
   receiving, by said management module, the information of failure from the back up device or from the electrical system, or both; and
   transmitting, by the management module during a discharge phase of the back up device, the command to start up the second power supply device.

8. The supply method according to claim 7, further comprising the following steps:
   following the reception by the management module of the failure information of the first active power supply device and the start up of the discharge phase of the back up device, waiting for a possible end of the failure, for a duration at the most equal to a maximum discharge duration of the back up device in order to supply the electrical system at a substantially constant predetermined voltage less a start up duration necessary for the second inactive power supply device; and
   at the end of said waiting, if the failure lasts, sending, by the management module, a command to start up the second power supply device.

9. The supply method according to claim 8, wherein the start up duration necessary for the second inactive power supply device is determined to be the duration between the sending by the management module of a command to start up the second power supply device and an instant at which this second power supply device is ready to supply the electrical system at said substantially constant predetermined voltage.

10. The supply method according to claim 7, further comprising the following steps:
    following the reception by the management module of the failure information of the first active power supply device and the start up of the discharge phase of the back up device, and if the second inactive power supply device is detected by the management module as not being available for replacing the first active power supply device, waiting for a possible end of the failure, for a duration at the most equal to a maximum discharge duration of the back up device in order to supply the electrical system at a substantially constant predetermined voltage less a duration necessary for shutting down the electrical system; and
    at the end of said waiting, if the failure lasts, sending, by the management module, a command to shut down the electrical system.

11. The supply method according to claim 7, further comprising:
    following the reception by the management module of the failure information of the first active power supply device, transmitting, by the management module to the electrical system, a command to switch to a reduced consumption mode of a computer comprising a mode of reduction of operating frequency and voltage of the computer when the electrical system comprises an information processing system with at least one computer supplied with extra-low voltage.

* * * * *